US006823574B2

(12) United States Patent
Swanson

(10) Patent No.: US 6,823,574 B2
(45) Date of Patent: Nov. 30, 2004

(54) TOOL FOR INSTALLING WHEEL STUDS

(76) Inventor: Richard C. Swanson, 5 Colony Dr., Orchard Park, NY (US) 14127

( * ) Notice: Subject to any disclaimer, the term of this patent is extended or adjusted under 35 U.S.C. 154(b) by 0 days.

(21) Appl. No.: 10/358,044

(22) Filed: Feb. 4, 2003

(65) Prior Publication Data

US 2004/0148749 A1 Aug. 5, 2004

(51) Int. Cl.[7] .................................... B23P 19/04
(52) U.S. Cl. .................................... 29/264
(58) Field of Search .................... 29/256, 254, 264, 29/255, 281.1, 263, 265, 273

(56) References Cited

U.S. PATENT DOCUMENTS

| | | | | |
|---|---|---|---|---|
| 4,207,663 A | * | 6/1980 | Page | 29/263 |
| 5,839,180 A | | 11/1998 | Hochmiller | |
| 6,601,277 B1 | * | 8/2003 | Swanson | 29/256 |

* cited by examiner

*Primary Examiner*—Robert C. Watson
(74) *Attorney, Agent, or Firm*—Hodgson Russ LLP

(57) ABSTRACT

A puller tool for installing wheel studs in a wheel hub comprises an outer sleeve having an axially extending passage, a washer defining a radial detent shoulder about the passage at one end of the sleeve, an actuating bolt including a threaded shank axially insertable into the passage and an enlarged head that engages the detent shoulder to prevent further insertion of the actuating bolt into the passage, and a puller member insertable into the passage for axially directed travel relative to the sleeve. The puller member is axially slidable relative to the outer sleeve by rotation of the actuating bolt which mates with a threaded hole in the puller member, and the puller member is prevented from rotating relative to the outer sleeve as it travels through a range of axial positions. The puller member includes a threaded stud hole through a stud end thereof for receiving a threaded shaft of the wheel stud, and a threaded bolt hole through an opposite bolt end thereof for receiving the shank of the actuating bolt. When torque is applied to the actuating bolt, the puller member is moved axially in the passage while an end of the outer sleeve or a spacer bears against the wheel hub, whereby the stud is drawn into interference fit within a hole in the wheel hub. Torque is preferably applied to the actuating bolt using an electric, pneumatic, or hydraulic torque wrench for efficient operation. The puller tool is modular in that different puller members and spacers can be provided for use with a standard sleeve and actuating bolt to accommodate different stud threads and lengths.

8 Claims, 2 Drawing Sheets

TOOL FOR INSTALLING WHEEL STUDS

FIELD OF THE INVENTION

The present invention relates generally to tools for vehicle maintenance, including truck maintenance, and more particularly to tools for installing a wheel-holding stud through a stud hole in a wheel hub.

BACKGROUND OF THE INVENTION

Traditionally, the task of installing a new stud in a stud hole of a wheel hub of a heavy truck, bus, trailer, recreational vehicle, or the like has been performed by removing the wheel hub and using a hydraulic press to press fit the stud into the stud hole. This method is time consuming, requires a hydraulic press, and involves removal of the wheel hub during servicing. Moreover, there is a risk of injury to the operator of the press.

U.S. Pat. No. 5,839,180 to Hochmiller discloses a tool for installing studs which obviates the need for a hydraulic press and allows the stud to be installed without removal of the wheel hub. The tool of Hochmiller comprises a cylindrical sleeve (case 15), an internally threaded adaptor 16 slidably received by case 15 and arranged to mate with a stud 10 positioned to extend through a stud hole 11 in a hub 12, a bolt-like piece 20 extending oppositely to the stud and also mated with threaded adaptor 16 through an opposite end thereof, a cylinder 25 fixed to an end of case 15 through which bolt-like piece 20 extends, and a spring-biased piston 30 partially received by cylinder 25 and arranged to engage head 21 of bolt-like piece 20. An axially directed pulling force is exerted on bolt-like piece 20 by pumping fluid (oil or compressed air) into the cylinder to force the piston, and thus bolt-like piece 20, away from case 15. This action pulls the stud 10 into press fit within stud hole 11. Differently threaded adaptors 16 and/or bolt-like pieces 20 are suggested to provide the ability to connect the bolt-like piece 20 to a particular stud 10 via adaptor 16. The tool of Hochmiller represents an advance over the prior art described in the preceding paragraph, however the piston/cylinder portion of the tool adds expense and complexity to the tool. Where hydraulic oil is used, there is additional cleanup involved.

SUMMARY OF THE INVENTION

Therefore, it is an object of the present invention to provide a puller tool for installing wheel studs that is inexpensive, simple to use, and safe to operate.

It is another object of the present invention to provide a puller tool for installing wheel studs that accepts an electric, pneumatic, or hydraulic torque wrench, which is already standard equipment at service garages, to generate separation force.

In furtherance of these and other objects, a puller tool for installing a stud through a stud hole in a wheel hub generally comprises an actuating bolt including a threaded shank and an enlarged head configured for cooperation with a torque wrench; an outer sleeve having an axial passage therethough for receiving a threaded shank of the actuating bolt; a washer defining a radial detent shoulder at one end of the sleeve for preventing insertion of the head of the actuating bolt into the passage; and a puller member received by the sleeve passage. The puller member is axially slidable relative to the sleeve, but the passage and puller member are configured to prevent the puller member from rotating relative to the sleeve as the puller member travels through a range of axial positions. The puller member has a threaded bolt hole through one end for mating with the shank of the actuating bolt and a threaded stud hole through an opposite end for mating with the threaded shaft of the stud. An optional spacer adapted for placement at an end of the sleeve opposite from the washer provides a means for accommodating studs of different lengths.

In operation, the puller member is inserted into the sleeve and mated with the stud, the actuating bolt is inserted through the washer and mated with the puller member, and an end of the sleeve or a spacer at the end of the sleeve is placed in abutment against the hub. When torque is applied to the head of the actuating bolt, it rotates to draw the puller member closer to the actuating bolt head, which is maintained at a constant distance from the hub by the washer, sleeve, and spacer. The puller member, which is confined against rotation, exerts axially directed force on the mated stud to install the stud in an interference fit within the stud hole of the hub.

The present invention also encompasses a modular kit wherein several differently threaded puller members are provided to fit different stud threads and several spacers of different axial thickness are provided to accommodate studs of different lengths, all of the puller members and spacers working with a common sleeve and actuating bolt.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
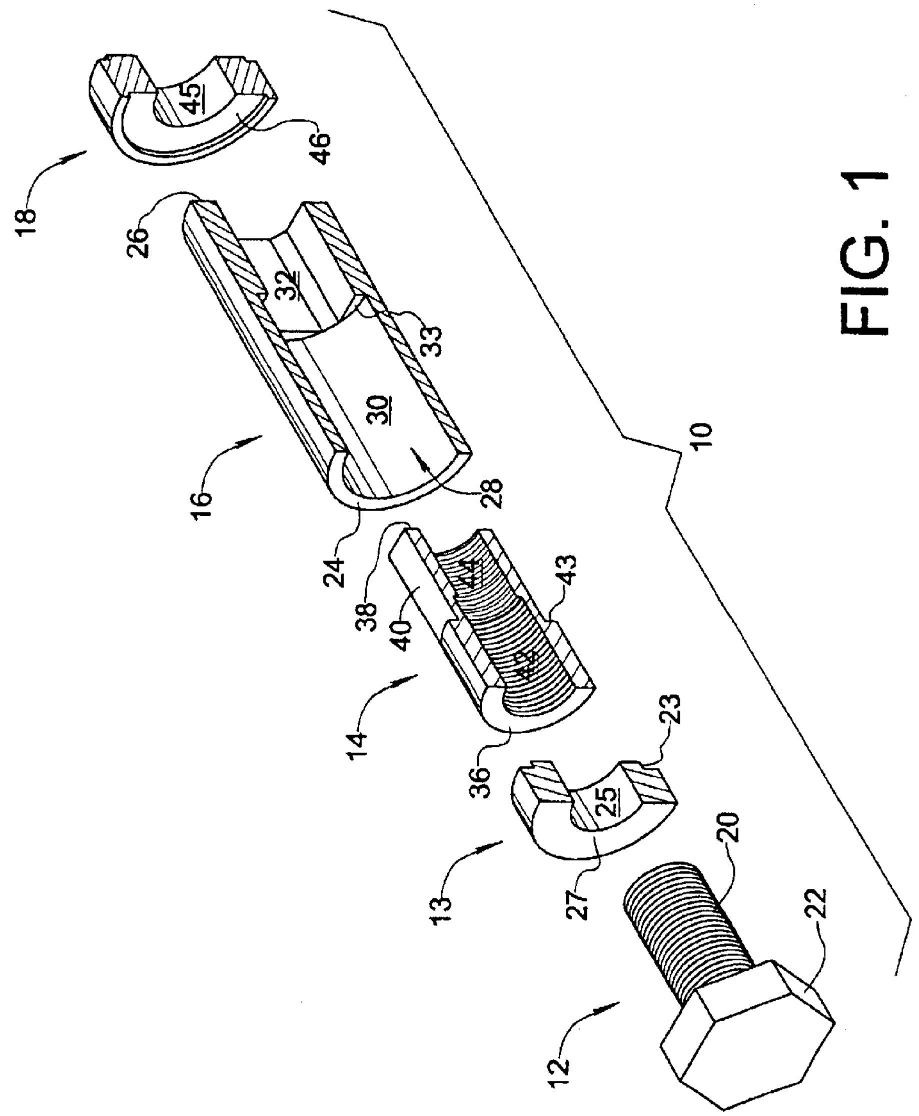
FIG. 1 is an exploded sectioned view of a stud puller tool formed in accordance with a preferred embodiment of the present invention.

Referring initially to FIG. 1 of the drawings, a stud puller tool formed in accordance with a preferred embodiment of the present invention is shown in an exploded sectioned view and identified broadly by the reference numeral 10. Puller tool 10 generally comprises an actuating bolt 12, a washer 13, a puller member 14, an outer sleeve 16, and a spacer 18.

Actuating bolt 12 is a common machine bolt that includes a threaded shank 20 and an enlarged head 22. Head 22 is preferably hexagonal in its cross-sectional shape to enable the application of torque to actuating bolt 12 by means of a standard hydraulic or pneumatic wrench familiar to persons skilled in the art of vehicle maintenance and repair. While a hexagonal shape is preferred, head may include or be of any configuration that facilitates torque transmission from a tool designed to apply torque. Consequently, head 22 might have an internal hexagonal socket for receiving an allen wrench style bit, or the shape of the head (or internal socket) might be some other polygon.

Outer sleeve 16 of the described embodiment is preferably formed of cylindrical steel bar or tube stock. Outer sleeve 16 includes a first end 24 and a second end 26 connected by an internal passage 28 extending in an axial direction through the sleeve. Passage 28 includes an envelope portion 30 adjacent first end 24 and a confinement portion 32 adjacent second end 26. Envelope portion 30 has a circular cross-sectional shape and is dimensioned to completely and slidably receive puller member 14. Confinement portion 32 has a non-circular cross-sectional shape for receiving at least a corresponding portion of puller member 14 such that the puller member 14 is slidable in an axial direction relative to outer sleeve 16 but is prevented from rotating relative to the outer sleeve. In the present embodiment, confinement portion 32 has a generally square cross-sectional shape with rounded corners, such shape providing two pairs of diametrically opposite flats, although other non-circular shapes are also possible. An internal shelf 33 is defined at the transition from envelope portion 30 to confinement portion 32.

Puller member 14 is preferably formed of cylindrical steel bar stock and includes a bolt end 36 and an opposite stud end 38. Adjacent bolt end 36, puller member 14 has a cylindrical external shape fitting in an axially slidable manner within envelope portion 30. Adjacent stud end 38, puller member 14 is characterized by a confinable portion 40 of a non-circular cross-sectional shape corresponding to the shape of confinement portion 32 of passage 28. As will be understood, when confinable portion 40 is at least partially received within confinement portion 32, puller member 14 is slidable in an axial direction relative to outer sleeve 16, but cannot rotate relative to the outer sleeve. Of course, the cross-sectional shape of confinable portion 40 and confinement portion 32 can be other than square. In particular, as one example, it is possible to provide an axially extending keyway in confinement portion 32 for receiving a corresponding key protruding radially from the confinable portion 40 of puller member 14. Puller member 14 further includes an external step 43 facing stud end 38.

Puller member 14 also includes an axially extending threaded bolt hole 42 through bolt end 36. Bolt hole 42 is of proper thread specification to mate with shank 20 of actuating bolt 12; for example, in an actual embodiment currently under development, actuating bolt 12 and bolt hole 42 have ⅞"—14 threads. Puller member 14 further includes a threaded stud hole 44 extending axially through stud end 38. The thread specification of stud hole 44 is chosen to agree with the thread specification of studs to be installed using puller member 14. For example, if studs having a ¾"—16 thread are to be installed, then stud hole 44 should have a ¾"—16 thread.

Washer 13 is preferably a metal ring-shaped piece used to spread the axial force transmitted between bolt head 22 and first end 24 of outer sleeve 16. Washer 13 is slightly greater in diameter than outer sleeve 16 and includes a radially reduced portion 23 substantially corresponding to the diameter of envelope portion 30 of sleeve passage 28 for enabling fast axial alignment of washer 13 with respect to sleeve 16. Washer 13 includes an axial through-hole 25 sized for receiving bolt shank 20 but not bolt head 22, whereby the washer serves to define a radial detent shoulder 27 for engaging bolt head 22. While washer 13 is preferably formed as a separate part from outer sleeve 16 to simplify machining and facilitate uncoupling of the tool after installation of a stud, it will be realized that detent shoulder 27 could be formed integrally with outer sleeve 16 and washer 13 omitted. If detent shoulder 27 is integrally formed with outer sleeve 16, then puller member 14 must be configured for insertion into passage 28 through second end 26 of the sleeve.

Spacer 18 is preferably a metal ring-shaped piece of suitable thickness depending upon the length of the wheel stud, and includes a central stud-receiving hole 45. The outer diameter of spacer 18 is slightly greater in than the outer diameter of sleeve 16 and includes an end recess 46 sized to receive second end 26 of outer sleeve 16 in axial alignment therewith.

Puller tool 10 is assembled by inserting threaded shank 20 of actuating bolt 12 through washer 13 and threadably mating the shank into threaded bolt hole 42 of puller member 14. Puller member 14 is inserted, stud end 38 first, into passage 28 of outer sleeve 16 through first end 24. Spacer 18 is placed in abutment with second end 26 of outer sleeve 16.

Figure 2A:
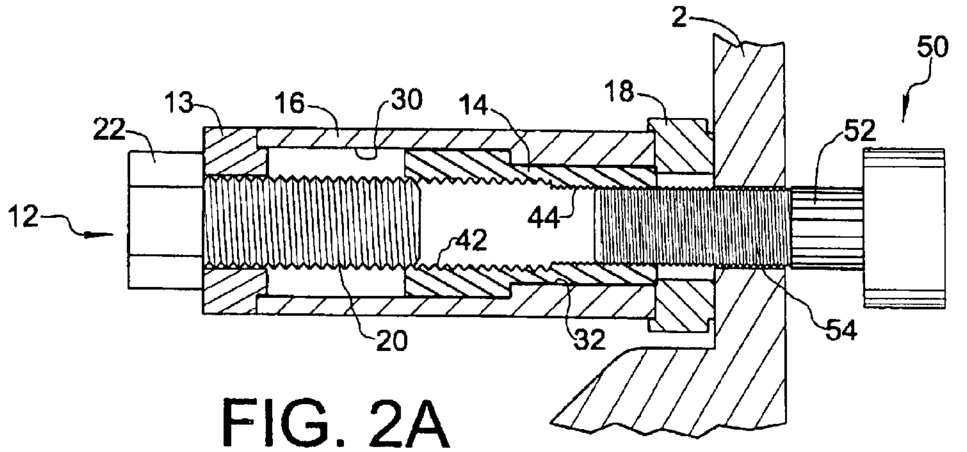
FIGS. 2A through 2C are a series of cross-sectional views showing operation of the stud puller tool shown in FIG. 1 for installing a stud through a stud hole of a wheel hub.
Figure 2B:
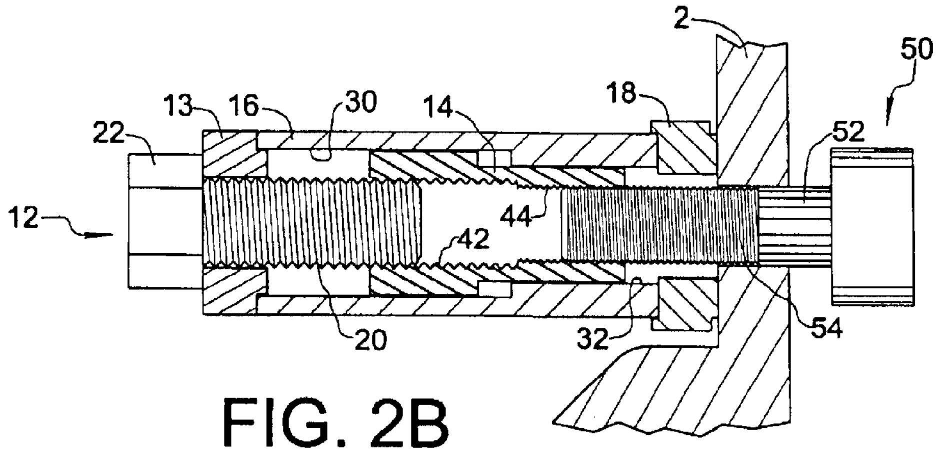
Figure 2C:
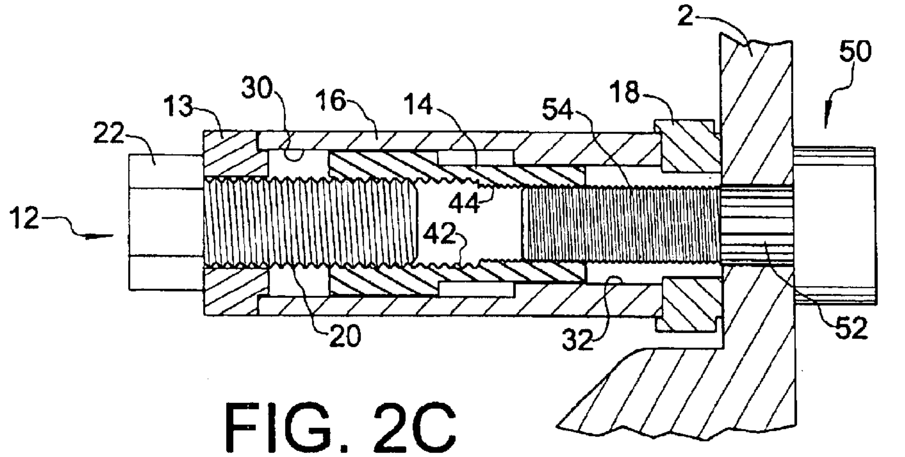

FIGS. 2A through 2C illustrate puller tool 10 of the present invention in operation to install a wheel stud 50 through a hole in a wheel hub 2. Actuating bolt 12 is initially in a loosened condition depicted in FIG. 2A and puller member 14 is inserted in passage 28 until external step 43 of the puller member engages internal shelf 33 of outer sleeve 16. A threaded shaft 54 of stud 50 is threadably mated with stud hole 44 of puller member 14 until a ribbed segment 52 of stud 50 is proximate the hole in hub 2. With spacer 18 pressed flush wheel hub 2 and actuating bolt 12 tightened manually to the point where head 22 is flush against washer 13, torque is applied to bolt head 22 using an automatic torque wrench. As will be understood, further tightening rotation of actuating bolt 12 moves puller member 14 and stud 50 axially toward first end 24 of outer sleeve 16. In this regard, outer sleeve 16, washer 13 and spacer 18 act to maintain a constant distance between bolt head 22 and wheel hub 2. Consequently, as puller member 14 is threadably moved, ribbed segment 52 of stud 50 is drawn into interference fit within the hole in wheel hub 2 as depicted in FIGS. 2B and 2C. It is intended that an electric, pneumatic, or hydraulic torque wrench be used to efficiently apply enough torque to actuating bolt 12 to firmly and fully install stud 50.

It will be appreciated from the foregoing description that the present invention provides a stud puller tool that is operable in a very efficient manner in conjunction with a standard electric, pneumatic, or hydraulic torque wrench to quickly install a stud in a wheel hub without need for removal of the hub. It will be further appreciated that the puller tool of the present invention is of a modular design, whereby different puller member inserts and spacers can be provided for different types and sizes of wheel studs while maintaining a standardized outer sleeve and actuating bolt.

What is claimed is:

1. A puller tool for installing a stud to extend through a stud hole in a wheel hub, said stud having a threaded shaft for receiving a lug nut, said tool comprising:

an actuating bolt including a threaded shank and an enlarged head fixed to said shank, said head being configured for cooperation with a tool for applying torque to said actuating bolt;

an outer sleeve having first and second opposite ends and a passage extending in an axial direction through said outer sleeve, said passage defining a first opening through said first end and a second opening through said second end;

a detent shoulder arranged to engage said head of said actuating bolt to prevent insertion of said head into said first opening of said outer sleeve;

a washer in abutment with said first end of said outer sleeve, wherein said detent shoulder is defined by said washer; and a puller member received by said passage of said sleeve through said second opening, said puller member being axially slidable relative to said sleeve through a range of axial positions wherein said puller member is prevented from rotational movement relative to said sleeve, said puller member having a bolt end, a stud end opposite said bolt end, a threaded bolt hole through said bolt end sized for mating with said shank of said actuating bolt, and a threaded stud hole through said stud end sized for mating with said threaded shaft of said stud.

2. A puller tool for installing a stud to extend through a stud hole in a wheel hub, said stud having a threaded shaft for receiving a lug nut, said tool comprising:

an actuating bolt including a threaded shank and an enlarged head fixed to said shank, said head being configured for cooperation with a tool for applying torque to said actuating bolt;

an outer sleeve having first and second opposite ends and a passage extending in an axial direction through said outer sleeve, said passage defining a first opening through said first end and a second opening through said second end;

a detent shoulder arranged to engage said head of said actuating bolt to prevent insertion of said head into said first opening of said outer sleeve; and a puller member received by said passage of said sleeve through said second opening, said puller member being axially slidable relative to said sleeve through a range of axial positions wherein said puller member is prevented from rotational movement relative to said sleeve, said puller member having a bolt end, a stud end opposite said bolt end, a threaded bolt hole through said bolt end sized for mating with said shank of said actuating bolt, and a threaded stud hole through said stud end sized for mating with said threaded shaft of said stud;

wherein said passage includes a confinement portion and said puller member includes a confined portion, said confinement portion of said passage and said confined portion of said puller member being configured to prevent rotation of said puller member relative to said sleeve when said confined portion of said puller member is at least partially received by said confinement portion of said passage and wherein said confinement portion of said passage and said confined portion of said puller member have corresponding generally polygonal configurations.

3. A puller tool for installing a stud to extend through a stud hole in a wheel hub, said stud having a threaded shaft for receiving a lug nut, said tool comprising:

an actuating bolt including a threaded shank and an enlarged head fixed to said shank, said head being configured for cooperation with a tool for applying torque to said actuating bolt;

an outer sleeve having first and second opposite ends and a passage extending in an axial direction through said outer sleeve, said passage defining a first opening through said first end and a second opening through said second end;

a detent shoulder arranged to engage said head of said actuating bolt to prevent insertion of said head into said first opening of said outer sleeve; and a puller member received by said passage of said sleeve through said second opening, said puller member being axially slidable relative to said sleeve through a range of axial positions wherein said puller member is prevented from rotational movement relative to said sleeve, said puller member having a bolt end, a stud end opposite said bolt end, a threaded bolt hole through said bolt end sized for mating with said shank of said actuating bolt, and a threaded stud hole through said stud end sized for mating with said threaded shaft of said stud;

wherein said passage includes a confinement portion and said puller member includes a confined portion, said confinement portion of said passage and said confined portion of said puller member being configured to prevent rotation of said puller member relative to said sleeve when said confined portion of said puller member is at least partially received by said confinement portion of said passage and wherein one of said confinement portion and said confined portion includes a keyway.

4. A puller tool for installing a stud to extend through a stud hole in a wheel hub, said stud having a threaded shaft for receiving a lug nut, said tool comprising:

an actuating bolt including a threaded shank and an enlarged head fixed to said shank, said head being configured for cooperation with a tool for applying torque to said actuating bolt;

an outer sleeve having first and second opposite ends and a passage extending in an axial direction through said outer sleeve, said passage defining a first opening through said first end and a second opening through said second end;

a detent shoulder arranged to engage said head of said actuating bolt to prevent insertion of said head into said first opening of said outer sleeve; and a puller member received by said passage of said sleeve through said second opening, said puller member being axially slidable relative to said sleeve through a range of axial positions wherein said puller member is prevented from rotational movement relative to said sleeve, said puller member having a bolt end, a stud end opposite said bolt end, a threaded bolt hole through said bolt end sized for mating with said shank of said actuating bolt, and a threaded stud hole through said stud end sized for mating with said threaded shaft of said stud, wherein said puller member includes an external step and said passage defines an internal shelf facing said first end of said sleeve for engaging said external step of said puller member to limit travel of said puller member relative to said sleeve.

5. A modular puller tool for installing studs to extend through stud holes in wheel hubs, said studs having respective threaded shafts having a plurality of different thread specifications for receiving a different corresponding lug nuts, said modular puller tool comprising:

an actuating bolt including a threaded shank and an enlarged head fixed to said shank, said head being configured for cooperation with a tool for applying torque to said actuating bolt;

an outer sleeve having first and second opposite ends and a passage extending in an axial direction through said outer sleeve, said passage defining a first opening through said first end and a second opening through said second end;

a radial detent shoulder arranged to engage said head of said actuating bolt to prevent insertion of said head into said first opening of said outer sleeve; and a plurality of interchangeable puller members intended for receipt by said passage of said sleeve through said second opening, each of said plurality of puller members being axially slidable relative to said sleeve and being prevented from rotational movement relative to said sleeve through a range of axial positions wherein said puller member is prevented from rotational movement relative to said sleeve, and each of said plurality of puller members having a bolt end, a stud end opposite said bolt end, a threaded bolt hole through said bolt end specified for mating with said shank of said actuating bolt, and a threaded stud hole through said stud end;

wherein said plurality of puller members are differentiated by a thread specification of said stud hole thereof.

6. The modular puller tool according to claim 5, wherein said plurality of puller members have the same thread specification of said bolt hole to operate with a single actuating bolt.

7. The modular puller tool according to claim 5, wherein said plurality of puller members the same external configuration to operate with a single sleeve.

8. The modular puller tool according to claim 5, wherein said respective threaded shafts of said studs have a plurality of different lengths, and said modular puller tool further comprises a plurality of annular spacers differentiated by an axial thickness thereof.

* * * * *